(12) United States Patent
Kano

(10) Patent No.: US 6,285,644 B1
(45) Date of Patent: Sep. 4, 2001

(54) OPTICAL PICKUP APPARATUS OF THIN TYPE WITH MAGNETIC CIRCUIT

(75) Inventor: Hisashi Kano, Kumamoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/305,120

(22) Filed: May 4, 1999

(30) Foreign Application Priority Data

May 12, 1998 (JP) .................................................. 10-128563

(51) Int. Cl.$^7$ .................................................. G11B 7/135
(52) U.S. Cl. .................................. 369/112.23; 369/44.16; 369/219; 369/244; 359/814; 359/824
(58) Field of Search .............................. 369/44.14–44.16, 369/44.22, 215, 219, 244, 112.23; 359/813–814, 823–824

(56) References Cited

U.S. PATENT DOCUMENTS

| | | | |
|---|---|---|---|
| 5,428,589 | * | 6/1995 | Shtipelman ........................ 369/44.15 |
| 5,446,721 | * | 8/1995 | Sekimoto et al. ............. 369/44.15 X |
| 5,602,808 | * | 2/1997 | Futagawa et al. ................ 369/44.14 |
| 5,748,580 | * | 5/1998 | Matsui ............................... 369/44.16 |

FOREIGN PATENT DOCUMENTS 4-351722    12/1992    (JP) .

* cited by examiner

Primary Examiner—W. R. Young
(74) Attorney, Agent, or Firm—Stevens, Davis, Miller & Mosher, LLP

(57) ABSTRACT

In order to provide an optical pickup apparatus having a structure suitable for making thin, compact and light, there is provided a yoke member having two standing plates for forming magnetic poles and a horizontal yoke plate for connecting the standing plates to each other and having a U-shaped cross section, magnets provided on surfaces in the mutually opposing sides of two standing plates, a focus coil formed by being wound in an annular shape and arranged around the standing plate in a movable manner in a height direction and two track coils formed by being wound in an annular shape, in which a size in the direction of the horizontal width of the magnet is set to be equal to or greater than a height in the standing direction of the magnet, and a size in the direction of the horizontal width of the yoke is set to be equal to or greater than a height in the standing direction of the yoke. Accordingly, it is possible to secure a cross sectional area of the magnetic circuit by increasing the size in the direction of the horizontal width of the yoke so as to set the thickness of the optical disc apparatus to be equal to or less than 10 mm.

7 Claims, 5 Drawing Sheets

OPTICAL PICKUP APPARATUS OF THIN TYPE WITH MAGNETIC CIRCUIT

BACKGROUND OF THE INVENTION

1. Field of the Invention

The present invention relates to an optical pickup apparatus used for an optical type recording and reproducing apparatus, and more particularly to an optical pickup apparatus structured in a thin type.

2. Description of the Related Art

In recent years, it is developed to make a portable type personal computer thin, compact and light. Further, a storage capacity of a memory apparatus used in the portable type personal computer tends to be significantly increased, so that an external memory apparatus having a large amount of capacity is necessary. Optical type recording mediums such as a compact disc (CD, having a low density) and a digital versatile disc (DVD, having a high density) are used for the external memory apparatus of the portable type personal computer since they have a great amount of capacity and can be easily treated. As a result, the optical type recording and reproducing apparatus is required to be made thin, compact and light. In particular, it becomes a key to making the optical type recording and reproducing apparatus thin to structure an optical pickup apparatus for optically accessing the medium in a thin type.

Hereinafter, a description will be given of a conventional optical pickup apparatus with reference to the accompanying drawings. FIG. 4 is a perspective view of a conventional optical pickup apparatus, FIG. 5 is an exploded perspective view and FIG. 6 is an exploded perspective view of a portion of a magnetic circuit in FIG. 4.

As shown in FIGS. 4 to 6, a suspension base 2 is fixed to a carriage 1. Further, an end of each of four suspension wires 3 is fixed to the suspension base 2. A lens holder 7 holds an object lens 4, a focus coil 5 and a track coil 6. Further, the other end of each of the suspension wires 3 is fixed to the lens holder 7 so as to support the lens holder 7 by the suspension wires 3 in a cantilever manner.

A magnet 8 is fixed to a yoke 9 so as to fix the yoke 9 to the carriage 1. In this case, the focus coil 5 and the track coil 6 are arranged so that they are within a magnetic field formed by opposing two magnets 8 to each other and cross a magnetic flux. Then, it is possible to drive the lens holder 7 in a focusing direction and a tracking direction by energizing the focus coil 5 and the track coil 6. Finally, a closed magnetic circuit is constituted by mounting a cap yoke 10 to an opening portion of the yoke 9.

FIG. 7 is a schematic view which explains a shape of a portion of a magnetic circuit in FIG. 6. In FIGS. 6 and 7, reference symbol w denotes a value of a horizontal width of the magnet 8 and reference symbol h denotes a value of a height in a standing direction. For example, the thinnest conventional optical pickup is formed in such a manner as to have a dimension of w=3.4 mm and h=4.2 mm, and structured so as to have a relation of w<h. This is because a vertically-long shape is formed for securing a large number of turns in the focus coil 5 and the track coil 6 and simultaneously for securing a sufficient focus stroke.

Further, at this time, a number of turns in the 10 focus coil 5 is expressed by a reference symbol n, a current flowing in the focus coil 5 is expressed by a reference symbol i, a magnetic flux density of a magnetic field (that is, a portion of both coils) generated by the opposing magnets 8 is expressed by a reference symbol B, and an effective length of the focus coil 5 crossing the magnetic flux is expressed by a reference symbol L, respectively. Further, since the portion crossing the magnetic flux is effective, the effective length of the focus coil 5 is the same as the value w of the horizontal width of the magnet 8. In this case, in an embodiment of the conventional optical pickup apparatus, n=141 turns, a finishing height of the focus coil 5 is 2.4 mm, and a thickness of the yoke 9 is 0.8 mm. Accordingly, a total height ht of the portion of the magnetic circuit (refer to FIG. 4) obtained by adding the thickness of the yoke 9 and the thickness of the cap yoke 10 to the value h of the height in the standing direction reaches 6.2 mm, and a total thickness t of a pickup module (refer to FIG. 4) including the carriage 1 requires 7.5 mm.

Reference numeral 20 denotes a line of magnetic flux generated by the magnet 8, which corresponds to a closed line circulating a rotation along the magnetic circuit. For reasons of explanation, it is supposed that the number of the lines of magnetic flux is six. Further, it is supposed that the number corresponds to a largest number of the lines of magnetic flux which can pass through the magnetic circuit on the basis of the strength of the magnet 8 and the cross sectional area of the yoke 9.

With respect to the conventional optical pickup apparatus structured in the manner mentioned above, an operation thereof will be described below. FIG. 8 is a schematic view which explains an operation of the portion of the magnetic circuit shown in FIG. 4. In FIG. 8, it is supposed that magnetic poles (N, S) of the magnet 8 are arranged in such a manner as shown in FIG. 8. For example, as shown by an arrow If, when energizing the focus coil 5, the focus coil 5 receives a force shown by an arrow Ff in accordance with Fleming's left-had rule, and the lens holder 7 moves upward in the drawing. Further, as shown by an arrow It, when energizing the track coil 6, the track coil 6 receives a force shown by an arrow Ft in accordance with Fleming's left-hand rule in the same manner, and the lens holder 7 moves to the leftward in the drawing. An electromagnetic force generated in both coils at this time and applied thereto is expressed by the following formula:

$$\text{Electromagnetic force} = niBL \qquad (1)$$

in which as mentioned above, reference symbol n denotes a number of turns of the coil, reference symbol i denotes a current flowing in the coil, reference symbol B denotes a density of the magnetic flux in both coil portions generated by the magnet 8, and reference symbol L denotes an effective length of the coil horizontally crossing the magnetic flux.

The conventional optical pickup apparatus as mentioned above is structured such that the size w in the direction of the horizontal width is made smaller than the height h in the standing direction of the yoke 9 for securing a stroke in the focusing direction. The height of the coil winding the coil is reduced when simply making the portion of the magnetic circuit thin in accordance with the requirement for making the optical pickup apparatus thin, so that the number of turns n of the coil shown in the formula (1) becomes small, and it is impossible to maintain a necessary electromagnetic force.

Then, for compensating for reduction of the number of turns n of the coil, it can be considered to strengthen the magnet 8 so as to increase the density B of the flux and to remove the cap yoke 10. However, the strengthening of the magnet 8 tends to be consumed by a magnetic saturation of the yoke 9. Further, when removing the cap yoke 10, the magnetic saturation of the yoke 9 is further easily generated. Accordingly, there is a limit of increasing the density B of the magnetic flux. As mentioned above, in the conventional optical pickup apparatus, there has been a limit of making it thin.

The present invention is made for solving the problems as mentioned above, and an object of the present invention is to provide an optical pickup apparatus having a structure suitable for making thin, compact and light.

SUMMARY OF THE INVENTION

In accordance with the present invention, there is provided an optical pickup apparatus comprising a yoke member having two standing plates for forming magnetic poles and a horizontal yoke plate for connecting the standing plates to each other and having a U-shaped cross section, permanent magnets provided on mutually opposing surfaces of two standing plates, a coil formed by being wound in an annular shape and arranged around the standing plate in a movable manner in a height direction, and a holding member holding an object lens and the coil and supported in a freely swinging manner by an electromagnetic force caused by the coil and the permanent magnet, wherein a size in the direction of the horizontal width of the permanent magnet is set to be equal to or greater than a height in the standing direction of the permanent magnet.

In accordance with the structure mentioned above, by increasing the size in the horizontal width direction of the yoke and securing the cross sectional area of the magnetic circuit, there can be obtained an optical pickup apparatus having a structure suitable for securing a magnetic characteristic of an actuator and making thin.

DESCRIPTION OF THE PREFERRED EMBODIMENTS

Figure 1:
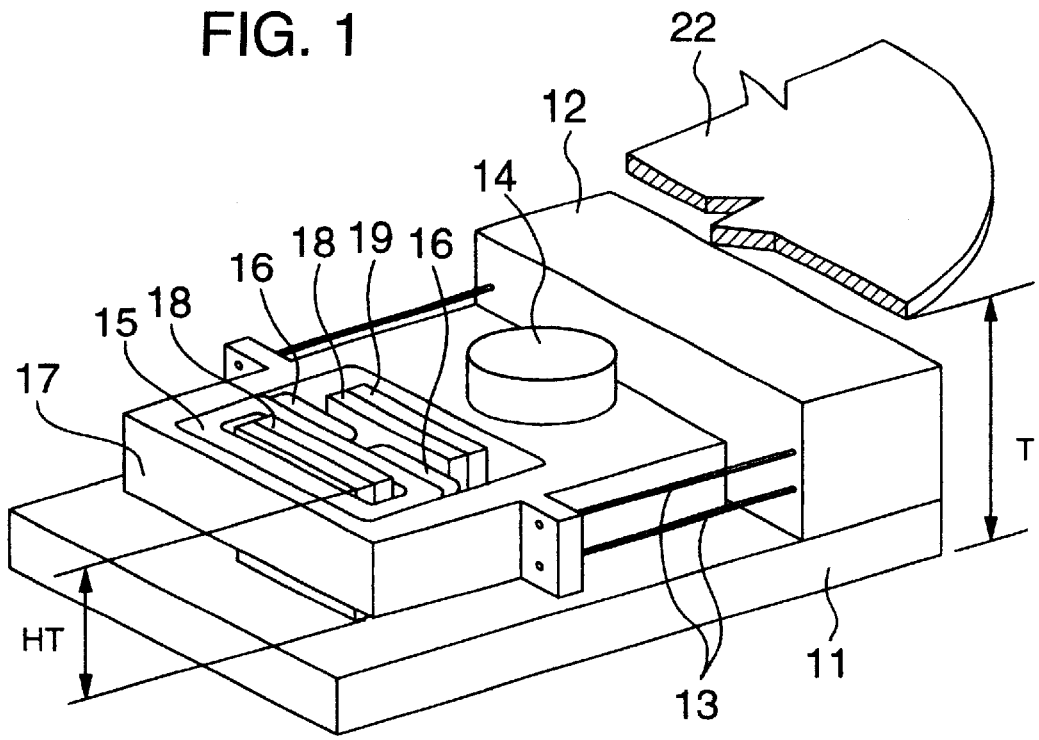
FIG. 1 is a perspective view of an optical pickup apparatus in an embodiment in accordance with the present invention.
Figure 2:
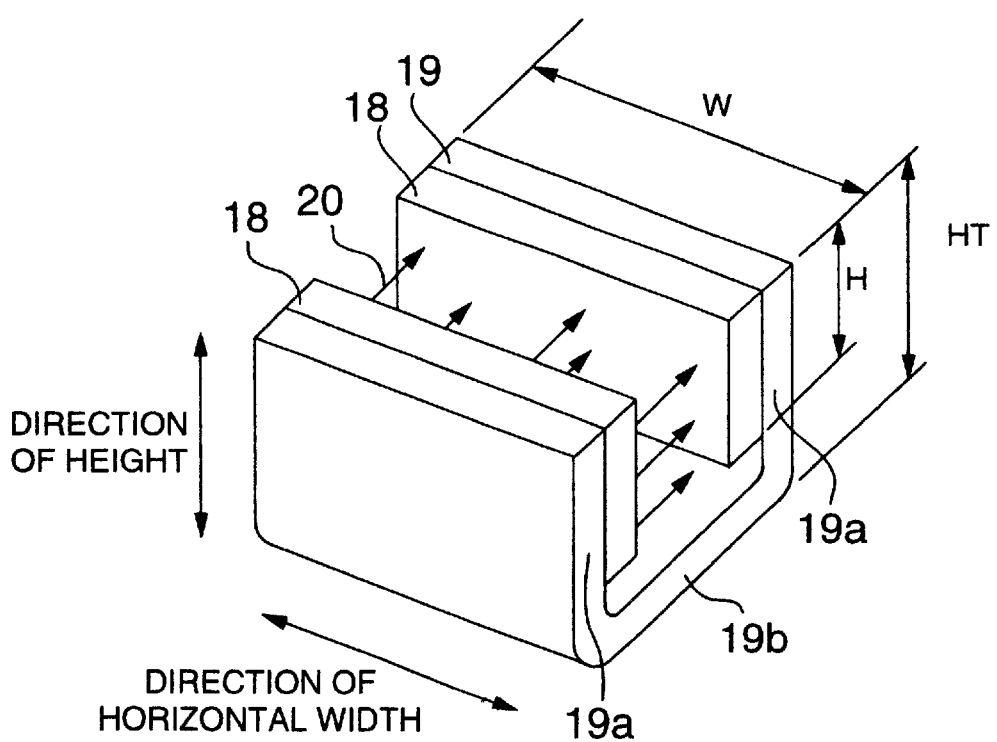
FIG. 2 is a perspective view of a main portion of a magnetic circuit in FIG. 1.

An optical pickup apparatus in accordance with the present invention will be described below on the basis of FIGS. 1 and 2. FIG. 1 is a perspective view of an optical pickup apparatus in an embodiment in accordance with the present invention, and FIG. 2 is a perspective view of a main portion of a magnetic circuit in FIG. 1. In FIGS. 1 and 2, a main structure is the same as that of the optical pickup described in the related art.

That is, a suspension base 12 is fixed to a carriage 11. Further, an end of each of four suspension wires 13 is fixed to the suspension base 12. A lens holder 17 holds an object lens 14, a focus coil 15 corresponding to a first coil and a track coil 16 corresponding to a second coil. Further, the other end of each of the suspension wires 13 is fixed to the lens holder 17 so as to support the lens holder 17 by the suspension wires 13 in a cantilever manner.

A yoke 19 has two standing yoke plate portions 19a and a horizontal yoke plate portion 19b for connecting the standing yoke plate portions 19a to each other and has a U-shaped cross section. A magnet 18 is fixed to each of the standing yoke portions 19a so as to fix the horizontal yoke plate portion 19b to the carriage 11. In this case, the focus coil 15 and the track coil 16 are arranged so that they are within a magnetic field of the magnets 18 and cross a magnetic flux. Here, in the present embodiment, a cap yoke is unnecessary, as described in detail below.

Figure 8:
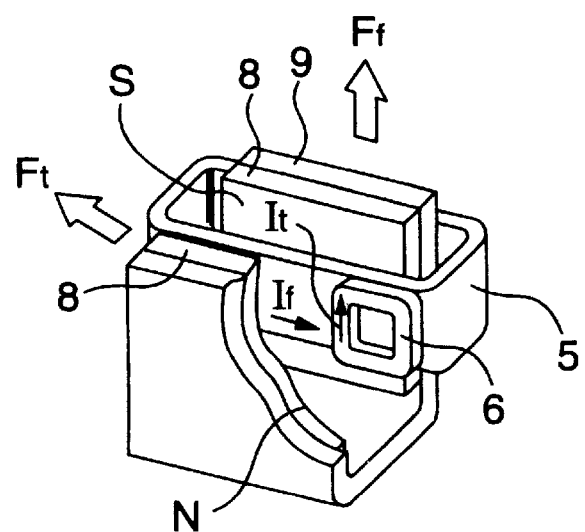
FIG. 8 is a schematic view which explains an operation of the portion of the magnetic circuit in FIG. 4.

In the optical pickup apparatus structured in the manner mentioned above, an operation thereof is the same as the operation already explained with respect to the related art and FIG. 8. That is, it is possible to drive the lens holder 17 in a focusing direction and a tracking direction by energizing the focus coil 15 and the track coil 16. The focus coil 15 receives a force shown by an arrow Ff and moves upward in the drawing, and the track coil 16 receives a force shown by an arrow Ff and moves to the leftward in the drawing. An electromagnetic force generated in both coils at this time can be expressed by the formula (1) in the same manner.

Next, in FIG. 2, Reference numeral 20 denotes a line of magnetic flux generated by the magnet 18, which corresponds to a closed line circulating along the magnetic circuit. Reference symbol W denotes a value of a horizontal width of the magnet 18, and reference symbol H denotes a value of a height in a standing direction (focusing direction) of the magnet 18. For example, the optical pickup apparatus in accordance with the present embodiment is formed in such a manner as to have a dimension of W=4.4 mm and H=3.8 mm, and structured so as to have a relation of W≧H. That is, the optical pickup apparatus having a structure suitable for making thin is characterized by changing a vertically-long shape of the magnet 18 which is necessarily formed in the related art to an inverse shape of W≧H.

In the same manner, a number of turns in the focus coil 15 is expressed by a reference symbol n', a current flowing in the focus coil 15 is expressed by a reference symbol i, a magnetic flux density of a magnetic field (that is, a portion of both coils) generated by the opposing magnets 18 is expressed by a reference symbol B', and an effective length of the focus coil 15 crossing the magnetic flux is expressed by a reference symbol L, respectively. Further, the effective length of the focus coil 15 is the same as the value W of the horizontal width of the magnet 18 in the same manner as that of the related art. In this case, in an embodiment of the optical pickup apparatus in accordance with the present invention, n'=115 turns, a finishing height of the focus coil 15 is 2.0 mm, and a thickness of the yoke 19 is 0.8 mm. Incidentally, in this embodiment, the horizontal yoke plate is further compression-formed to have the thickness of 0.6 mm. Accordingly, a total height HT of the portion of the magnetic circuit obtained by adding the thickness of the yoke 19 to the value H of the height in the standing direction is reduced to 4.4 mm. That is, it is possible to reduce the total height HT from 6.2 mm in accordance with the related art to 4.4 mm in accordance with the present embodiment so as to make thin, that is, reduce to 70% of the conventional height.

Next, a change of an electromagnetic force caused by making thin will be verified by comparing with the related art. In the present embodiment, the following relations are established.

$$W = (4.4/3.8) \times w = 1.16 \times w \quad (2)$$

$$H = (3.8/4.2) \times h = 0.90 \times h \quad (3)$$

On the basis of the actual values shown above, the magnetic flux density will be verified. Since a thickness (t) and a material of the yoke 19 are the same as those of the related art and a cross sectional area of the yoke 19 is obtained by the formula W×t, the cross sectional area is 1.16 times the conventional one in accordance with the formula (2). Since the material of the yoke 19 is the same, the magnetic flux capable of being passed through the yoke 19 is 1.16 times (that is, seven) the conventional one if it is used under generally the same magnetic flux density as that of the related art. On the contrary, since the magnetic flux density of the magnetic field generated by the magnet 18 is a magnetic flux per a unit area of the magnetic field, the following relation is established.

Magnetic flux density B'=1.16 times magnetic flux/area of magnetic field (W×h)=1.16/1.16×0.90=1.1

Accordingly, although the apparatus is made a thin size corresponding to 70% the conventional one and the cap yoke is canceled, the magnetic flux density of the magnetic field can be 10% increased in comparison with the related art.

Next, an effective length of the focus coil 15 will be verified. Since a winding structure of the focus coil 15 and a wire of the coil are the same as those of the related art and the coil is extended in correspondence to an expansion of the horizontal width W, the effective length of the focus coil 15 becomes 1.16 times that of the related art. Further, the number of turns n' of the focus coil 15 satisfies the following relation.

n'=(115/141)×n=0.816×n

On the basis of the result mentioned above, the electromagnetic force in accordance with the present embodiment is obtained by substituting the above for the formula (1) and is expressed by the following formula.

Electromagnetic force of the present invention=0.816×n i×1.1×B×1.16×L=1.0×niBL

Accordingly, the present embodiment can secure the same generated electromagnetic force as that of the related art although it is made a thin size corresponding to 70% the conventional one.

Further, in accordance with the present embodiment, the finishing height of the focus coil 15 is restricted to 2.0 mm with respect to the height H in the standing direction of the magnet 18 of 3.8 mm. Accordingly, it maintains rooms which can correspond to the changes such as an increase of the current i, an increase of the number of turns n', a further reduction of the value of the height H and the like.

Figure 3A:
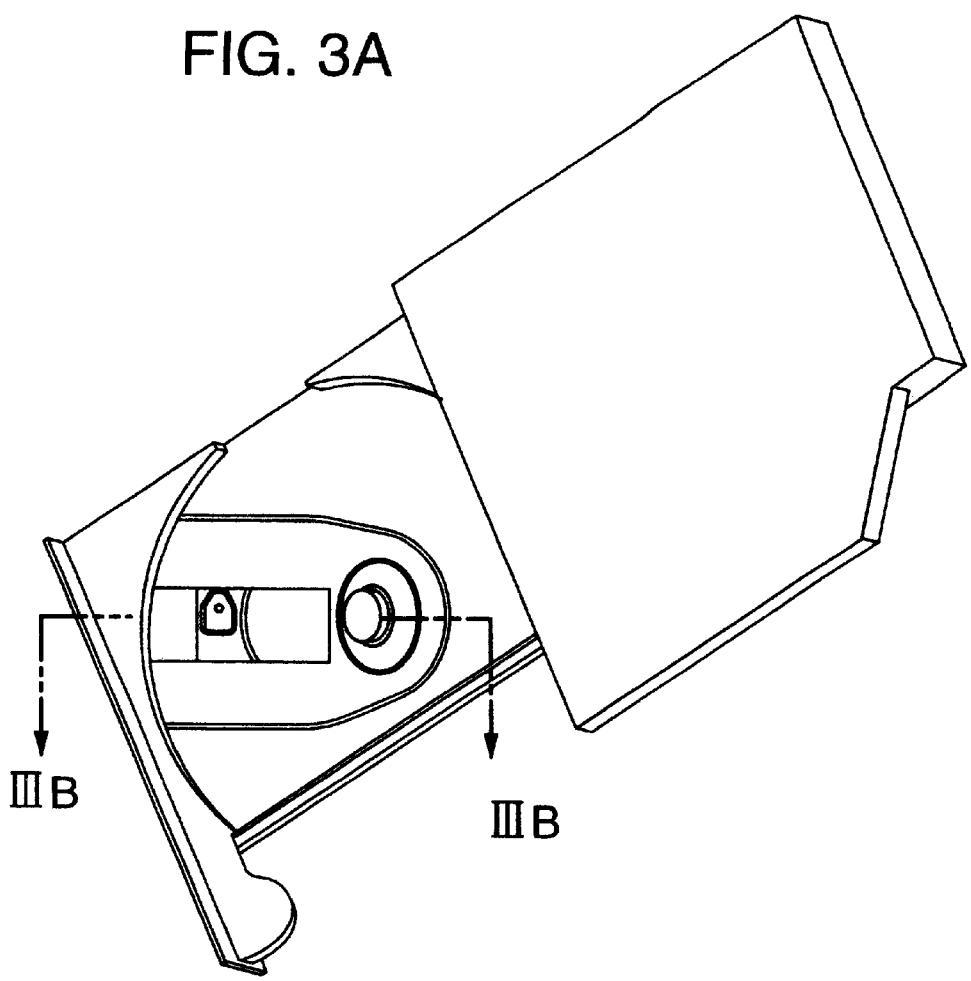
FIG. 3A is a schematic view of a disc apparatus in an embodiment in accordance with the present invention.
Figure 3B:
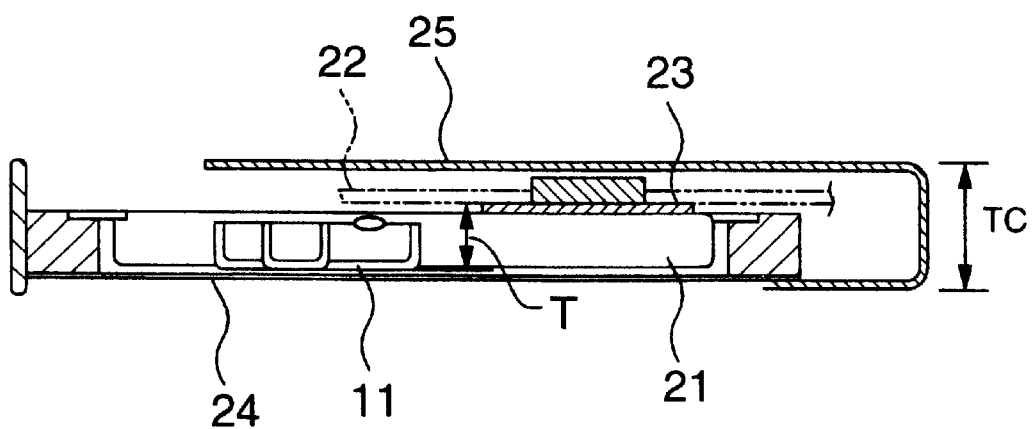
FIG. 3B is a cross sectional view of a main portion of the disc apparatus in FIG. 3A.
Figure 4:
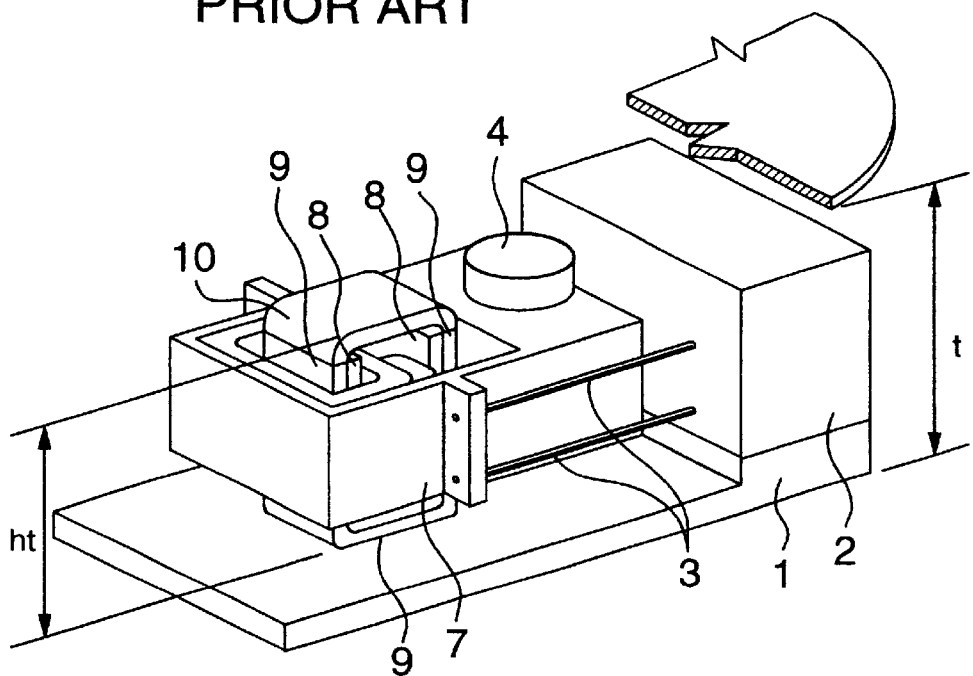
FIG. 4 is a perspective view of a conventional optical pickup apparatus.
Figure 7:
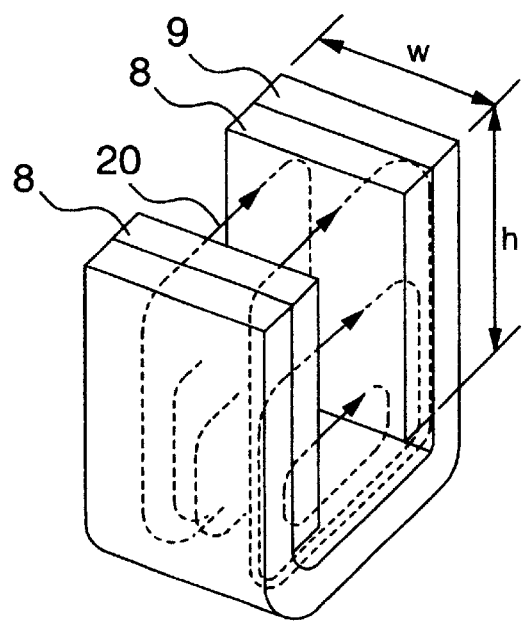
FIG. 7 is a schematic view which explains a shape of the portion of the magnetic circuit in FIG. 6.
Figure 5:
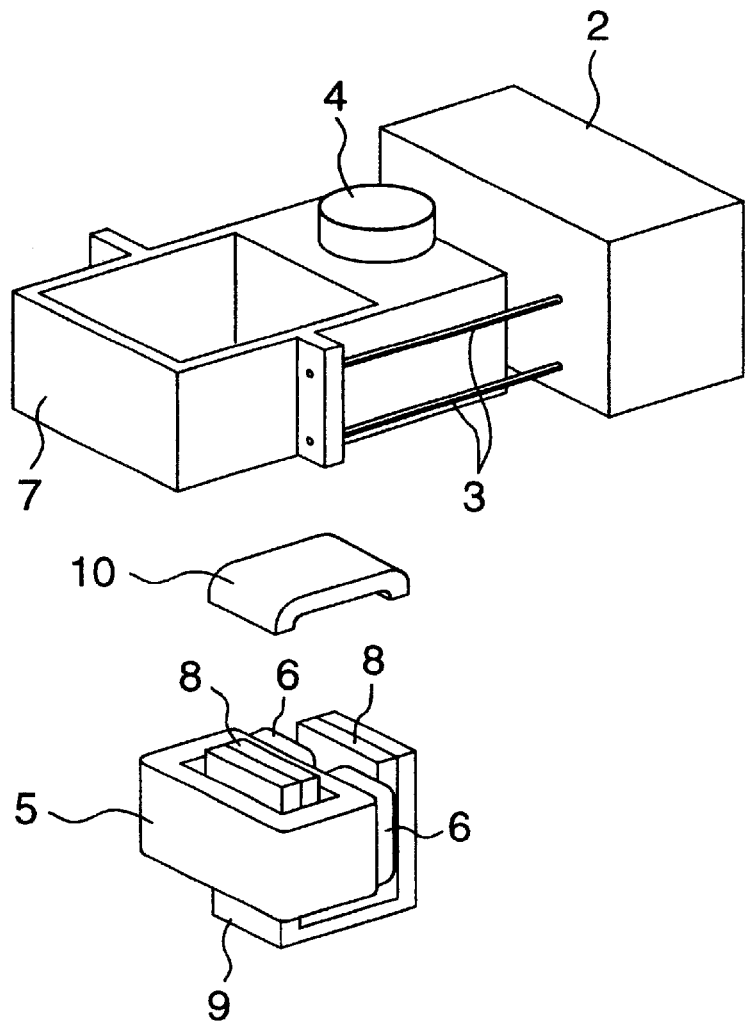
FIG. 5 is an exploded view of the optical pickup apparatus in FIG. 4.
Figure 5:
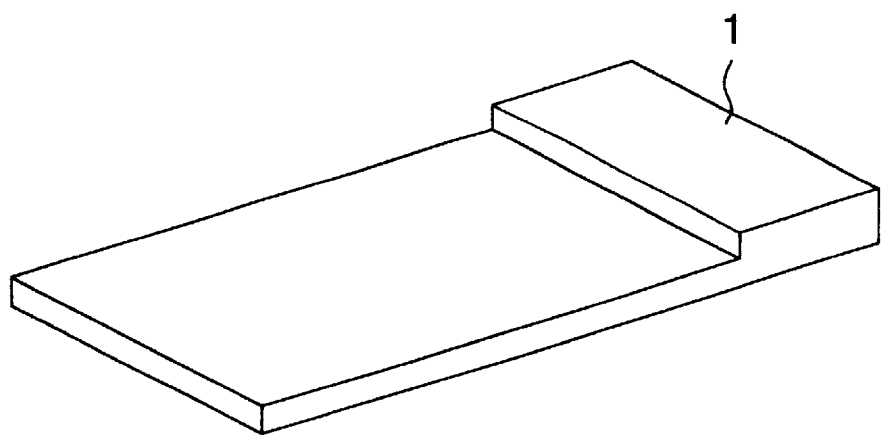
Figure 6:
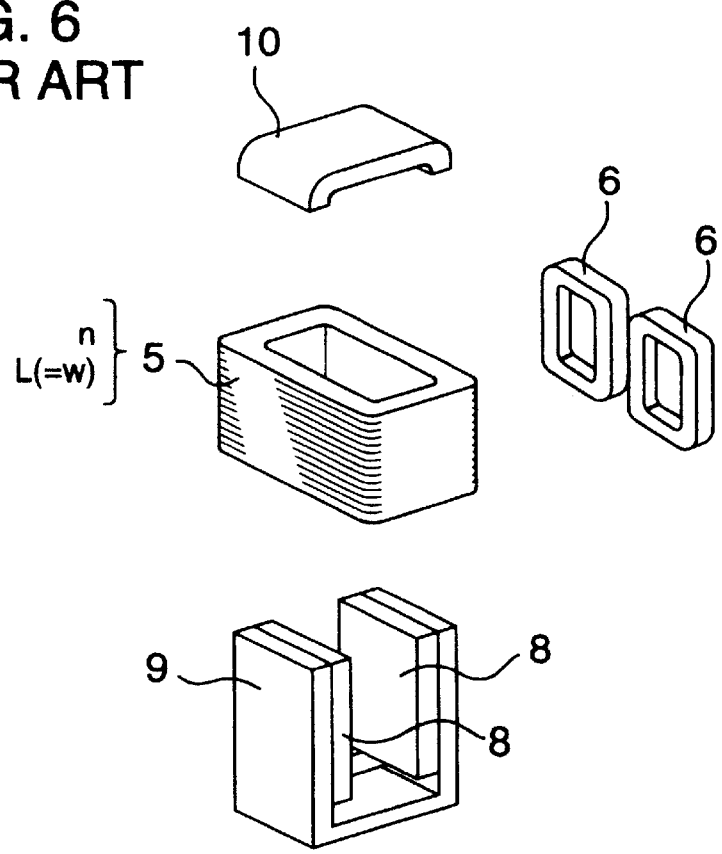
FIG. 6 is an exploded view of a portion of a magnetic circuit in FIG. 4.

Next, a description will be given of the case of using the optical pickup apparatus of the present invention as structured in the above manner to the disc apparatus. FIG. 3A shows a disc apparatus in an embodiment in accordance with the present invention, and FIG. 3B is a cross sectional view of a main portion thereof along a line 3B—3B in FIG. 3A. In FIG. 3B, the carriage 11 is mounted to a pickup module 21. At the same time, a turn table 23 which mounts a disc 22 is mounted to a spindle motor (not shown), and the spindle motor is mounted to the pickup module 21. Further, the pickup module 21 is mounted to a tray 24 via a vibration isolating insulator (not shown). The tray 24 is mounted to a case 25 in such a manner as to be drawable therefrom. At this time, a height T from a lower surface of the disc 22 to a lower surface of the carriage 11 at a time of mounting the disc 22 to the turn table 23 corresponds to a total thickness T of the pickup module shown in FIG. 1. Accordingly, by adding a thickness necessary for the spindle motor and the turn table to the total height HT of 4.4 mm mentioned above, a total thickness T of 5.5 mm of the pickup module 21 can be obtained, and by adding a total of 2.3 mm of the thickness of the disc 22 and the height for mounting the disc and a total of 4.0 mm of the size of the housing space for the tray 24 and the thickness of the case material thereto, an outer thickness TC of the case 25 becomes 9.5 mm.

Here, the present embodiment has been described with respect to the case in which a round copper wire having a wire diameter of 80 $\mu$m is turned around the focus coil 15 at 115 turns so as to set the finishing height to 2.0 mm and the value of the height H of the magnet 18 is set to 3.8 mm in anticipation of the focus stroke. However, the present invention is not limited to the values mentioned above. For example, since a space factor of the coil is improved when using a square-shaped copper wire of the same type for the coil wire material, it is possible to make further thin. As a result, the finishing height of the focus coil 15 can be reduced to 1.15 mm, and the value of the height H of the magnet 18 can be reduced to 2.35 mm in anticipation of the focus stroke. Then, the total height HT can be reduced to 2.95 mm, the total thickness T of the pickup module can be reduced to 4.05 mm, and the outer thickness TC of the case can be reduced to 8.05 mm, respectively.

Further, when making thin as mentioned above, the cap yoke can be cancelled and the volume of the magnet 18 and the yoke 19 can be reduced, so that the magnetic circuit can be lightened. Still further, as a result, the strength of the whole of the carriage 11 and the pickup module can be reduced and lightened. Since the thickness of each of the members is reduced in a process of this lightening, it is possible to arrange in such a manner as to easily absorb an increase of the horizontal width of the yoke 19 which has been considered to be difficult in the related art.

As mentioned above, by constructing the shape of the magnet 18 in such a manner as to satisfy the relation W≧H, the structure suitable for making thin can be obtained, so that it is possible to structure the optical pickup apparatus having the total height HT equal to or less than 4.4 mm. Then, the optical disc apparatus using the optical pickup apparatus in accordance with the present invention can set the thickness of the whole of the optical disc apparatus (the outer thickness of the case which is measured in a perpendicular direction to the disc surface) TC to 10 mm or less. Then, since it is possible to make the computer apparatus using the optical disc apparatus, in particular, the computer apparatus used in a mobile computing thin, it is possible to provide the optical disc apparatus having a more expanded utilizing field.

What is claimed is:

1. An optical pickup apparatus comprising:
a yoke member having two standing plates for forming magnetic poles and a horizontal yoke plate for connecting said standing plates to each other and having a U-shaped cross section;
permanent magnets provided on mutually opposing surfaces of said two standing plates;

a coil formed by being wound in an annular shape and arranged around one of said standing plates in a movable manner in a height direction; and a holding member holding an object lens and said coil and supported in a freely swinging manner by an electromagnetic force caused by said coil and said permanent magnets, wherein a horizontal width of said permanent magnets is equal to or greater than a height in the standing direction of said permanent magnets, and wherein a horizontal width of the yoke is equal to or greater than a total height in a standing direction of the yoke member.

2. An optical pickup apparatus according to claim 1, wherein the size in the direction of the horizontal width of said yoke member is 4.4 mm and the height in the standing direction thereof is 3.8 mm, and wherein the horizontal width of the yoke member is 4.4 mm and the total height in the standing direction thereof is 4.4 mm.

3. An optical pickup apparatus according to claim 1, wherein a total height in the standing direction including said permanent magnets, said yoke member and said holding member is set to be between 2.95 mm and 4.4 mm.

4. An optical pickup apparatus according to claim 3, wherein when a medium is mounted to the optical pickup apparatus, a height from a lower surface of the medium to a lower surface of the optical pickup apparatus is set to be equal to or less than 5.5 mm.

5. An optical disc apparatus, wherein a thickness of a whole of the optical disc apparatus is set to be equal to or less than 10 mm by using the optical pickup apparatus according to claim 3.

6. An optical pickup apparatus according to claim 1, wherein when a medium is mounted to the optical pickup apparatus, a height from a lower surface of the medium to a lower surface of the optical pickup apparatus is set to be equal to or less than 5.5 mm.

7. An optical disc apparatus using the optical pickup apparatus according to claim 1, wherein a thickness of a whole of the optical disc apparatus is equal to or less than 10 mm.

* * * * *